Oct. 2, 1962  J. V. MILEWSKI ETAL  3,056,279
APPARATUS FOR IMPACT TESTING
Filed Oct. 22, 1959  2 Sheets-Sheet 1
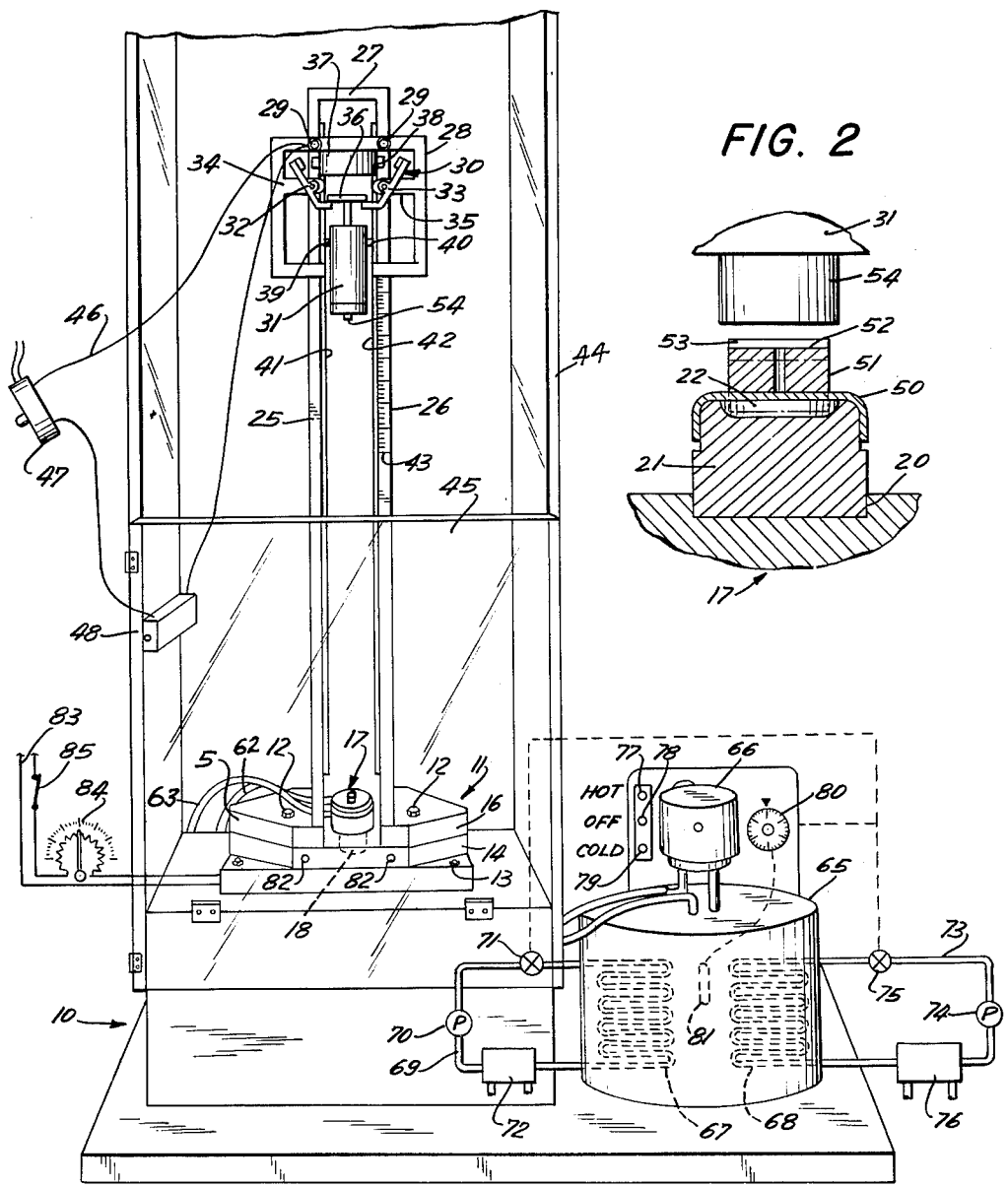
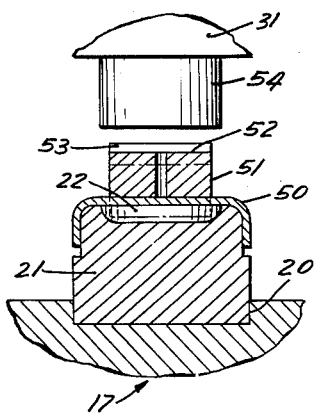
INVENTORS.
JOHN V. MILEWSKI
WILLIAM O. SEALS
BY
Curtis, Morris & Safford
ATTORNEYS Oct. 2, 1962   J. V. MILEWSKI ETAL   3,056,279
APPARATUS FOR IMPACT TESTING
Filed Oct. 22, 1959   2 Sheets-Sheet 2
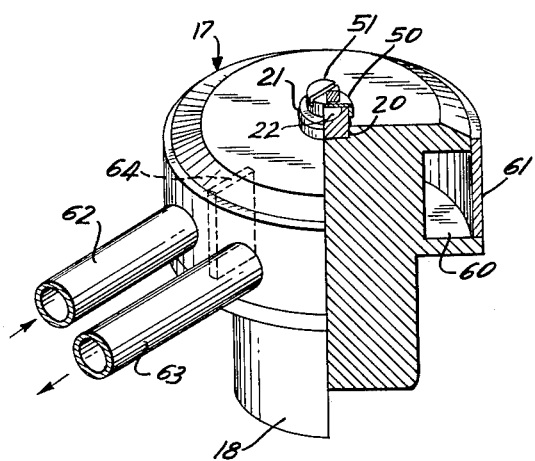
FIG.3
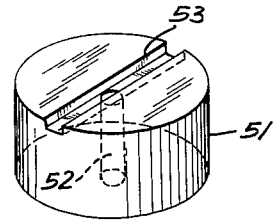
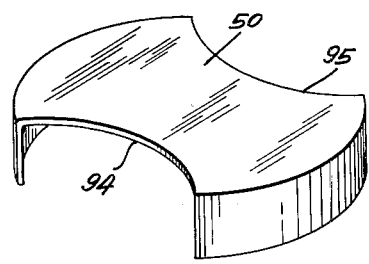
FIG.5
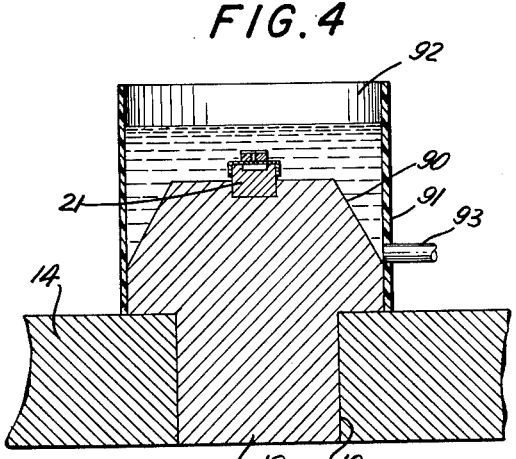
FIG.4
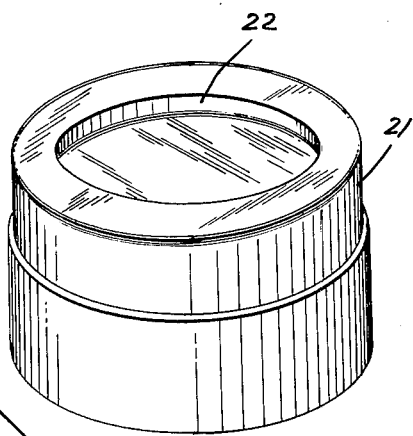
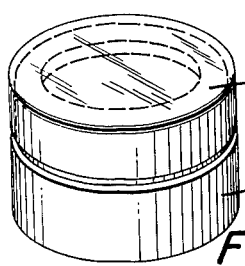
FIG.6
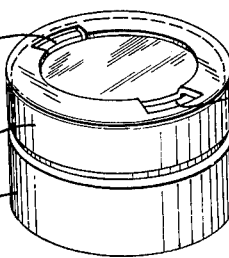
FIG.7
INVENTORS.
JOHN V. MILEWSKI
WILLIAM O. SEALS
BY
Curtis, Morris & Safford
ATTORNEYS

United States Patent Office 3,056,279
Patented Oct. 2, 1962

3,056,279
APPARATUS FOR IMPACT TESTING
John V. Milewski, Saddle Brook, and William O. Seals, Budd Lake, N.J., assignors to Thiokol Chemical Corporation, Bristol, Pa., a corporation of Delaware
Filed Oct. 22, 1959, Ser. No. 847,924
12 Claims. (Cl. 73—35)

The present invention relates to an apparatus for impact testing and more particularly to testing samples of materials to determine the threshold impact required to detonate the materials.

The present invention is particularly adapted for testing materials to be used in rockets to determine whether the materials may be detonated by impact and the minimum impact at which each material detonates in the presence of an oxidizing agent. All rockets contain an oxidizing agent of one form or another to burn a fuel which provides the thrust. In many rockets, the oxidizing agent is liquid oxygen. The delivery of liquid oxygen to a combustion chamber or zone must be controlled which requires valves that must be lubricated and other moving parts that are packed with a suitable stuffing material to prevent leakage. Thus, different materials, such as lubricants and stuffing materials, for example, are contacted by the liquid oxygen and may be subject to detonation at a particular impact. Detonation of materials in a rocket by impact may destroy a rocket before it has accomplished its function. Therefore, it is essential that the materials to be used in a rocket be tested for impact to be sure that the threshold impact at which the material detonates is well below the impact force to which the material is subjected in a particular rocket. While the present invention is particularly adapted for testing materials used in rockets, it will be understood that the method and apparatus of the present invention may have other applications.

One of the objects of the present invention is to provide an apparatus for subjecting a material to be tested to varying impact forces under different ambient conditions.

Another object is to provide an apparatus for determining the threshold impact force at which a particular material may detonate in the presence of an oxidizing agent at any particular temperature.

Another object is to provide an impact testing apparatus for immersing a material to be tested in an oxidizing agent while subjecting it to an impact force.

Another object is to provide an improved impact testing apparatus which may be used to test practically all varieties and types of materials over a wide and accurately controlled temperature range.

Still another obejct is to provide an impact testing apparatus which is of simple and compact construction to adapt it for economical manufacture and one which is reliable in operation to give reproducible results and without danger to the attendant.

These and other objects will become more apparent from the following description and drawings in which like reference characters denote like parts throughout the several views. It is to be expressly understood, however, that the drawings are for the purpose of illustration only and are not a definition of the limits of the invention, reference being had for this purpose to the appended claims.

In the drawings:
FIGURE 1 is a perspective view of an apparatus for impact testing in accordance with the method of the present invention;
FIGURE 2 is an enlarged sectional view of the cup for containing a sample to be tested and showing the cap and plug overlying the recess in the cup;
FIGURE 3 is a perspective view of the anvil on which the sample cup is mounted and illustrated partly in section to show the hollow channel in the anvil through which a heat exchange medium may be circulated to maintain the anvil and sample at a particular desired temperature;
FIGURE 4 is a sectional view of an anvil of modified construction with an annular collar to provide a well surrounding the cup to which oxygen may be supplied;
FIGURE 5 is a further enlarged extended view of the cup, cap and plug and showing one particular form of cap which is particularly effective in immersing the sample in oxygen in either liquid or gaseous phase;
FIGURE 6 is a perspective view of a cap of modified construction having a continuous wall overlying the sample recess in the cup for use with samples when mixed with a more stable oxidizing agent; and
FIGURE 7 is a perspective view of a still further modified cap construction for use with oxygen in a liquid or gaseous phase.

The method performed by the apparatus of the present invention comprises the steps of immersing a sample of material to be tested in an oxidizing fluid and maintaining the sample at a desired temperature, subjecting the sample to the impact force of a falling weight, progressively increasing the height of the falling weight to increase the impact force until the material detonates, if it does detonate within a particular range of impact force, and recording the impact force required to detonate the material. To this end, a sample of the material to be tested is placed in a cup having an open recess in the top and positioned in alignment with the falling weight. The open top of the cup is covered by a cap of a thin, yieldable material and overlying the cap is a plug which, when struck by the falling weight, forces and extrudes the cap into the recess and impacts the sample of material being tested.

When the sample is to be tested with certain oxidizing fluids, such as oxygen in either a liquid or gaseous phase, the sample is placed in the recess in the cup and a cap having openings of a particular shape is placed over the top of the cup. Oxygen surrounding the cup then flows through the openings in the cap to immerse the sample. When the sample is to be tested with other oxidizing agents, such as liquid peroxides, the sample is placed in the recessed cup and the peroxide poured into the cup to immerse the sample of material to be tested. In such tests, an imperforate cap is placed over the top of the cup.

It is particularly desirable to test samples at different temperatures corresponding to actual temperatures to which it may be subjected to an impact force in a rocket, for example. The sample of material when immersed in liquid oxygen will be maintained at the boiling temperature of the oxygen at atmospheric pressure, but if the sample is immersed in oxygen in a gaseous phase or in any other stable oxidizing agent, the sample is maintained at any desired temperature. In accordance with the present invention, the material to be tested is maintained at a desired temperature by a heat exchange fluid circulated in heat exchange relation with the cup and sample. The heat exchange fluid may be cooled below or heated above the atmospheric ambient temperature. To produce extremely low temperatures, the cup may be subjected to liquified gases having a desired boiling temperature at atmospheric pressure which is substituted for the circulating heat exchange fluid. For extremely high temperatures, the cup may be heated by electric heating elements.

When testing a particular material, identical samples of the material are placed in separate cups and subjected to the impact of the falling weight of a particular fixed mass of, for example, 500 or 1,000 grams. The height through which the weight falls is progressively increased in successive samples until the material detonates or does not detonate. If the material does not detonate within a particular range of impact force, it may be considered safe to use for particular purposes. On the other hand, if the material does detonate, the minimum or threshold impact force at which it detonates is determined to be sure that it may be used safely for the particular purposes. As the mass of the weight and height through which it falls are known, the impact force in foot-pounds can be measured to determine the threshold impact force at which the material detonates. It has been determined experimentally that the foot-pounds of impact force at which a particular material detonates in the presence of an oxidizing fluid at a particular temperature is reproducible when tested in accordance with the method of the present invention.

Different types of materials, such as fluorinated lubricating oils, elastomer materials and plastics have been impact tested in accordance with the method of the present invention in the presence of oxidizing agents, such as oxygen in liquid and gaseous phases, water and peroxides at different temperatures to determine the threshold values of the shock sensitivity of the materials. The shock sensitivity of the materials if the materials do detonate, such as lubricating oils with other materials at different concentrations also has been determined so that only those materials having a high resistance to detonation by impact are selected for use in rockets.

Referring now to the drawings, an apparatus is illustrated for testing samples of materials in accordance with the present invention. The apparatus comprises a suitable base 10 on which a horizontal base plate assembly 11 is mounted and attached thereto as by bolts 12. In the illustrated embodiment the base plate assembly comprises a lower plate 13, an intermediate plate 14 and side plates 15 and 16 overlying the intermediate plate in spaced relation to provide a recessed channel therebetween. An anvil 17 is mounted on the intermediate plate 14 in the recessed channel between side plates 15 and 16. The anvil 17 may have other shapes, but is illustrated in cylindrical form with a reduced cylindrical shank 18 depending through a vertical hole 19 in the intermediate plate to accurately position the anvil on the base, see FIGURES 1 and 4. The anvil 17 is of hardened steel with its top forming a horizontal platform and provided with an axial counter-bore 20 for holding a sample cup 21 having an open recess 22 in its top as later explained in detail.

Extending upwardly from the base plate assembly 11 are vertical stanchions 25 and 26. Two of such stanchions are illustrated for simplicity of description, but it will be understood that three or four such stanchions may be provided. The upper ends of the stanchions 25 and 26 are connected together by a cross bar 27 to hold the upper ends accurately spaced.

An adjustable frame 28 is slidably mounted on the stanchions 25 and 26 and has thumb screws 29 for locking the frame at any adjusted height on the stanchions. The frame 28 mounts a latch mechanism 30 for releasably holding a weight 31 which, when released, falls by gravity to impact the material being tested in the cup 21. The latch mechanism 30 comprises a pair of opposed latch arms 32 and 33 pivotally mounted on ears 34 and 35 of the frame 28, respectively, for engaging their lower ends with the underside of a flanged shoulder 36 at the upper end of the weight. An electro-magnet 37 on the frame 28 has a core 38 positioned between the upper ends of the pivoted arms 32 and 33 which are drawn toward the core of the magnet when the latter is energized to simultaneously release the flanged shoulder 36 on the weight. The weight then falls by gravity toward the anvil 17 and the weight has laterally projecting lugs 39 and 40 which project into channels 41 and 42 on the stanchions 25 and 26 to guide the weight as it falls freely from the frame 28. One of the stanchions 26 has a scale 43 marked thereon to indicate the height of the weight 31 about the sample cut 21.

A cabinet structure 44 encloses at least the anvil 17 of the testing apparatus to protect the attendant during an impact test and the cabinet has a hinged door 45 at the front to permit access to the anvil. The door 45 may be formed of a transparent plastic, such as "Lucite," so that the impact on the specimen cup may be observed.

The release of the impacting weight 31 is controlled by an electric circuit 46 connected to the electro-magnet 37 and containing a manually operable push button switch 47. The electric circuit 46 also includes a safety switch 48 connected in series with the push button switch 47 and operated by the hinged door 45 in its closed position. Thus, the weight 31 can be released and the material impacted, which may produce a detonation, only when the hinged door 45 of the cabinet structure 44 is closed.

In accordance with the present invention, the sample cup 21, as illustrated in FIGURE 2, is of cylindrical form to adapt it to seat in the counter-bore 20 of the anvil 17 with the recess 22 in its top positioned directly under the weight 31. The cup 21 advantageously is made of chrome plated hardened steel. A cap 50 overlies the recess 22 in the cup 21 and is composed of a thin, yieldable material, such as aluminum or brass, depending upon its compatibility with the material being tested. Overlying the cap 50 is a plug 51 of cylindrical shape and of a size to force and extrude the cap into the recess 22 in the cup 21 and trap the sample therein during impact. The plug 51 may be of chrome plated hardened steel and has an axial bore 52 and a transverse slot 53 extending across the top of the plug and intersecting the bore. The bore 52 and slot 53 in the plug 51 permit the easy escape of any air which might be trapped between the top of the plug and reduced striker 54 at the lower end of the weight 31. When the striker 54 of the weight 31 engages the plug 51, the latter forces and extrudes the cap 50 into the recess 22 of the cup 21 and impacts the material being tested therein with a force in foot-pounds corresponding to the mass of the weight and its height above the cup.

The sample being tested is maintained at any desired temperature by conduction to the anvil 17 which is maintained at a fixed temperature. To this end, the cup 21 has a good thermal contact with the anvil 17 and the material in the recess 22 of the cup will quickly attain the temperature of the cup. The anvil 17, as illustrated in FIGURE 3, has an annular channel 60 formed therethrough which a heat exchange medium may be circulated to maintain the anvil, cup 21 and material being tested at the desired temperature. The channel 60 is formed by cutting an annular recess in the periphery of the anvil 17 and then closing the outer periphery of the recess by welding a circular strip 61 to the anvil. Inlet and outlet conduits 62 and 63 are connected to the strip and a transverse closure plate 64 extends across the channel 60 between the conduits to cause the heat exchange medium to flow through the anvil 17 in the annular path formed by the channel 60.

The heat transfer medium, preferably in a liquid phase, and having boiling and freezing points above and below the temperature range to be controlled, is contained in a tank 65, as shown in FIGURE 1. A pump 66 delivers the heat exchange medium through the inlet conduit 62 to the annular channel 60 in the anvil 17 and from the anvil through the outlet conduit 63 to return the liquid back to the tank. Heating and cooling coils 67 and 68 are provided in the tank 65 for either heating or cooling the heat exchange medium as desired. The heating coil 67 is connected in a loop circuit 69 having a pump 70, a valve 71 and heat exchanger 72. The heat exchanger may be in the form of a steam chamber for heating a fluid circulating in the loop circuit 69. Thus, when the pump 70 is operating and the valve 71 is open a heating medium is supplied to the heating coil 67 to heat the heat transfer medium circulated by the pump 66. The cooling coil 68 is connected in a similar loop circuit 73 having a pump 74, valve 75 and heat exchanger 76. In this circuit the heat exchanger 76 may constitute an evaporator of a refrigeration system to cool the heat exchange medium in the tank. The heating or cooling of the anvil 17 is controlled by the three push button switches 77, 78 and 79. Push button 77 initiates operation of the circulating pump 66 and pump 70 in the heating circuit 69; and push button 79 initiates operation of the circulating pump 66 and pump 74 in the cooling circuit 73. Push button 78 stops operation of all of the pumps 66, 70 and 74 and resets the push buttons 77 and 79. An adjustable thermostat 80 also is provided having a bulb 81 responsive to the temperature of the heat exchange medium in tank 65 and connected to operate the valve 71 or 75 in the heating and cooling circuits 69 and 73. Thus, by setting the thermostat 80 for a particular temperature and actuating a push button 77 or 79, the heat exchanger medium in the tank 65 is either heated or cooled as desired and is circulated through annular channel 60 in the anvil 69 to maintain the material being tested at a desired temperature.

When extremely high temperatures are required an insulated electric resistance unit 82 in the intermediate plate 14 of the base plate assembly 11 is energized, see FIGURE 1. The electric resistance unit 82 may be in separate sections or connected together at the rearward end (not shown) and connected to a source of electric current 83. A potentiometer 84 is provided in one of the lines from the power supply to deliver current to the resistance unit 82 at a controlled rate to produce the heating required. The electric circuit also includes a switch 85 for manually opening and closing the circuit to the heating unit 82.

When extremely low temperatures are desired, a liquified gas of a composition to boil at a particular temperature may be caused to flow through the annular channel 60 of the anvil 17 to cool the anvil and sample in cup 21 to the desired low temperature.

When the sample is to be tested in the presence of liquid oxygen, a solid anvil 90, as illustrated in FIGURE 4, may be used. Anvil 90 has a collar 91 at its periphery which projects upwardly above its top to provide a well 92 surrounding the sample cup 21. The liquid oxygen may be poured from a flask into the open top of the well 92 to immerse the cup 21 and sample of material therein, but in the illustrated embodiment a conduit 93 is provided for supplying the oxygen to the well 92. Instead of supplying liquid oxygen the conduit 93 may supply oxygen in a gaseous phase to the well 92 to immerse the cup 91 and sample or any other suitable oxidizing agent may be supplied through the conduit 93.

When the sample to be tested is to be immersed in oxygen, either in a liquid or gaseous phase, a cap 50 of the shape illustrated in FIGURE 5 may be used to cover the sample cup 21. As will be observed by reference to FIGURE 5, the cap 50 has arcuate recesses 94 and 95 at opposite sides with the inner edges of the arcuate recesses overlapping the reversely curved arcuate edges of the circular recess 22 in the cup 21. The construction of the cap 50 has been found to be critical and the particular form of arcuate recesses 94 and 95, as illustrated in FIGURE 5, have been found to be the most desirable. Other forms of openings in the cap 50 have been found to be ineffective or less effective to immerse the sample of material in the liquid oxygen.

When the sample of material to be tested is immersed in other more stable oxidizing liquids, such as peroxides, or water, the material to be tested is mixed with the fluid in the recess 22 of the cup 21. A cap 50a, as illustrated in FIGURE 6, then may be used having an imperforate top to cover the top of the cup 21.

A modified construction of cap 50b is illustrated in FIGURE 7 which is suitable for use when testing samples in the presence of oxygen in either a liquid or gaseous phase. The cap 50b illustrated in FIGURE 7 has a slightly recessed imperforate center of a diameter slightly less than the recess 22 in cup 21 and arcuate slots 96 and 97 at opposite sides corresponding to the contour and overlying the edge portions of the cup recess. Thus, the slots 96 and 97 provide openings into the recess 22 of cup 21 the same as in the cap illustrated in FIGURE 5, but the slots do not extend to the peripheral edge of the cap. It has been found that cap 50b can be used with a solid plug 51 without a hole 52 or slot 53 illustrated in FIGURE 5. The construction of the impact testing apparatus having now been described, the mode of operation to test materials is next explained.

To perform a test, a number of samples of the material to be tested are placed in individual sample cups 21. If the samples are to be tested with a stable oxidizing medium, such as peroxide or in water, a cap 50a, such as illustrated in FIGURE 6, is used. If the material is to be tested in the presence of an oxidizing agent, such as oxygen, either in a liquid or gaseous phase, a cap 50 or 50b, such as illustrated in FIGURES 4 and 7, is used.

Assuming for purposes of description that the samples are to be tested at atmospheric ambient temperature with a cap 50a, a cup containing a sample mixed with and immersed in an oxidizing agent is placed in the counter bore 20 of the anvil 17. The frame 23 with the weight 31 attached thereto by the latching mechanism 30 is then raised on the stanchions 25 and 26 to the minimum height at which impact would be expected and the thumb screws 29 tighten to clamp the frame on the stanchions. The door 45 of the cabinet 44 is then closed which, in turn, closes the safety switch 48. An impact test is then initiated by pressing the push button switch 47 which, operating through the electro-magnet 37, actuates the latch arms 32 and 33 to release the weight 31 which falls by gravity. The striker 54 on weight 31 hits the plug 51 which forces and extrudes the cap 50a into the recess 22 of cup 21 and impacts the material therein with a force in foot-pounds depending upon the mass of the weight and distance through which it falls. If the material does not detonate, the operation is repeated with another sample with the weight at a higher level. The test is continued on successive samples with the weight at progressively higher levels until the material does detonate and the foot-pounds of force is recorded.

If the test is to be performed at some temperature other than atmospheric ambient, the thermostat 80 is set to the particular temperature desired and the particular push button 77 or 79 actuated to either heat or cool the heat transfer medium in tank 65. The heat exchange medium in the tank 65 then will be heated or cooled by the coils 67 and 68 and circulated by the pump 66 through the annular channel 60 in the anvil 17 to heat or cool the sample of material to the desired temperature. The impact testing of the material is performed in the same way as explained above.

When the material is to be tested in the presence of oxygen, either in a liquid or gaseous phase, the samples are placed in the recesses 22 of a plurality of cups 21 and the top of the cups covered by a cap 50 or 50b, illustrated in FIGURES 4 and 7. When oxygen in a gas phase is used and the sample is to be tested at a temperature other than atmospheric, an anvil 17 is used; and when oxygen in liquid phase is used, a solid anvil 90 is used; but in either case a collar 91 is applied to the anvil to form a well 92. A cup 21 containing a sample is then placed in the counter bore 20 of the anvil 17 or 90 and oxygen supplied through the open top of the well 92 or through the conduit 93. The oxygen in either liquid or gaseous phase flows through the openings 94, 95 or 96, 97 in the cap 50 or 50b to immerse the sample being tested. The weight 31 is then released to impact the material in successive sample cups from progressively higher levels. When oxygen in gaseous phase is used with an anvil 17, the temperature of the material being tested may be controlled by circulating a heat exchange medium through the annular channel 60 in the anvil.

It will now be observed that the present invention provides an apparatus for subjecting a material to be tested to varying impact forces under different ambient conditions. It also will be observed that the present invention provides an apparatus for determining the threshold impact force at which a particular material will detonate in the presence of an oxidizing agent at any particular temperature. It will further be observed that the present invention provides an impact testing apparatus for immersing a material to be tested in an oxidizing agent while subjecting it to an impact force and one which may be used to test practically all varieties and types of materials over a wide and accurately controlled temperature range. It will still further be observed that the present invention provides an impact testing apparatus of simple and compact construction adapted for economical manufacture, operable without danger to the attendant and reliable in operation to give reproducible results.

While a preferred embodiment of the invention is herein illustrated with several modified constructions of sample cup caps, it will be understood that further changes may be made in the construction and arrangement of elements without departing from the spirit or scope of the invention. Therefore, without limitation in this respect, the invention is defined by the following claims.

We claim:

1. Impact testing apparatus comprising a fixed anvil, a cup mounted on the anvil and containing a sample to be tested, a deformable cap overlying the top of the cup to confine the sample in the cup, a plug overlying the cap for transmitting force to deform the cap, stanchions projecting upwardly from the anvil, a frame mounted for vertical adjustment on said stanchions, latching means on the adjustable frame for supporting a weight at different heights above the cup and operable to release the weight which falls and operating through the cap and plug impacts the material in the cup, means for indicating the height of the weight above the cup, and means for maintaining the sample at any desired temperature when impacted.

2. Impact testing apparatus comprising a base, an anvil mounted in the base and having a recess on the top thereof, a removable cup in the recess in the anvil and containing a sample to be tested, guide stanchions projecting upwardly from the base at the sides of the anvil, a frame mounted for vertical adjustment on said stanchions, latching means on the adjustable frame for supporting a weight at different heights above the cup and operable to release the weight which falls and impacts the material in the cup, means for indicating the height of the weight above the cup, and means co-operating with said cup for immersing the sample in an oxidizing agent.

3. Impact testing apparatus comprising an anvil having a recess in the top, a removable cup mounted in the recess in the anvil, said cup having a recess for containing a sample to be tested, said sample being immersed in an oxidizing fluid in the cup, a cap of a thin, yieldable material covering the top of said cup and sample, a plug of a hard, rigid material overlying the cap and of a size to cause extrusion of the cap into the recess in the cup and trap the sample therein, and mechanism for releasing a weight from different heights to fall freely onto the top of the plug whereby the plug deforms the cap and impacts the sample with a predetermined force.

4. Apparatus for testing samples of a material for impact comprising a cup having a recess for containing a sample to be tested, said sample being immersed in an oxidizing fluid in the recess in said cup, a cap of a thin, yieldable material covering the top of said cup and sample, a plug of a hard, rigid material overlying the cap and adapted to extrude the cap into the recess in said cup and impact the material in the recess, and said plug being of a size relative to the open top of the recess to trap the sample of material therein during impact.

5. Impact testing apparatus in accordance with claim 1 in which the means for maintaining the sample at any desired temperature comprises an anvil having a hollow channel therein, and means for flowing a heat transfer medium through the hollow channel in the anvil to maintain the sample to be tested at any desired temperature.

6. Impact testing apparatus in accordance with claim 8 in which the means for flowing a heat transfer medium through the hollow channel in the anvil comprises a tank, a pump, lines connecting the pump and tank to circulate the heat transfer medium through the hollow channel in the anvil, heat exchange elements in the tank for heating and cooling the heat transfer fluid, and a thermostat responsive to the temperature of the fluid in the tank for controlling the heating and cooling of the heat transfer fluid.

7. Impact testing apparatus in accordance with claim 1 in which an enclosure surrounds the anvil and has a door to provide access to the anvil, electrically operated means for actuating the latch including an electric circuit having an electro-magnet for operating the latching means, a manually operable switch in the circuit, and a safety switch connected in series with the manually operable switch in the circuit and operated by the door of the closure whereby to prevent operation of the latch when the door of the closure is open.

8. Impact testing apparatus in accordance with claim 3 in which an oxidizing fluid is mixed with the sample in the recess in the cup, and the top of said cap being imperforate.

9. Impact testing apparatus in accordance with claim 3 in which the oxidizing fluid is oxygen, a collar surrounding the anvil to provide a well for the oxygen, and said cap having openings overlying the recess in the cup to immerse the sample in oxygen.

10. Impact testing apparatus in accordance with claim 8 in which the recess in the cup is circular and the cap has arcuate recesses at opposite sides which extend inwardly from the edges of the cap and overlie the circular edges of the recess in the cup to provide openings through which oxygen enters the recess to immerse the material being tested.

11. Impact testing apparatus in accordance with claim 8 in which the recess in the cup is circular and the cap has arcuate openings concentric with and overlying the circular recess in the cup adjacent its edges to provide openings through which oxygen enters the recess in the cup to immerse the material therein.

12. Impact testing apparatus in accordance with claim 8 in which the oxidizing fluid is liquid oxygen which enters the recess in the cup through the openings in the cap to immerse the sample in the cup and maintain the sample at the boiling temperature of the liquid oxygen.

References Cited in the file of this patent

UNITED STATES PATENTS

| | | |
|---|---|---|
| 1,801,449 | Olsen et al. | Apr. 21, 1931 |
| 2,659,235 | Storer | Nov. 17, 1953 |
| 2,755,658 | Brown | July 24, 1956 |
| 2,832,213 | Cole et al. | Apr. 29, 1958 |

OTHER REFERENCES

Publication: Bureau of Mines, Report of Investigations No. 4667, 1949 (pages 8b, 10, 11).